Aug. 3, 1948.  J. P. PUTNAM  2,446,433
GEOMETRICAL NAVIGATION INSTRUMENT
Filed Dec. 8, 1944  2 Sheets-Sheet 1
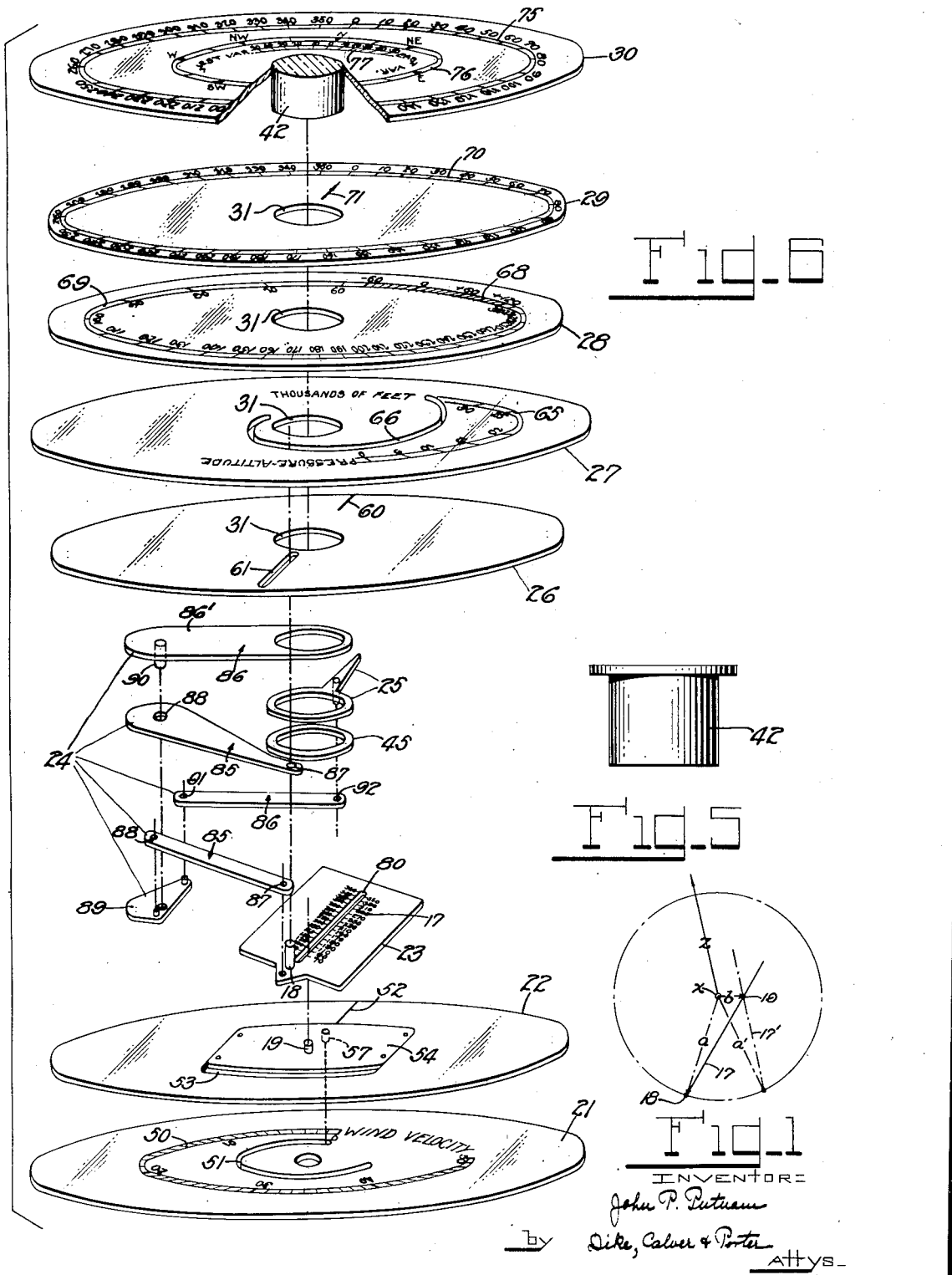

Aug. 3, 1948.  J. P. PUTNAM  2,446,433
GEOMETRICAL NAVIGATION INSTRUMENT
Filed Dec. 8, 1944  2 Sheets-Sheet 2
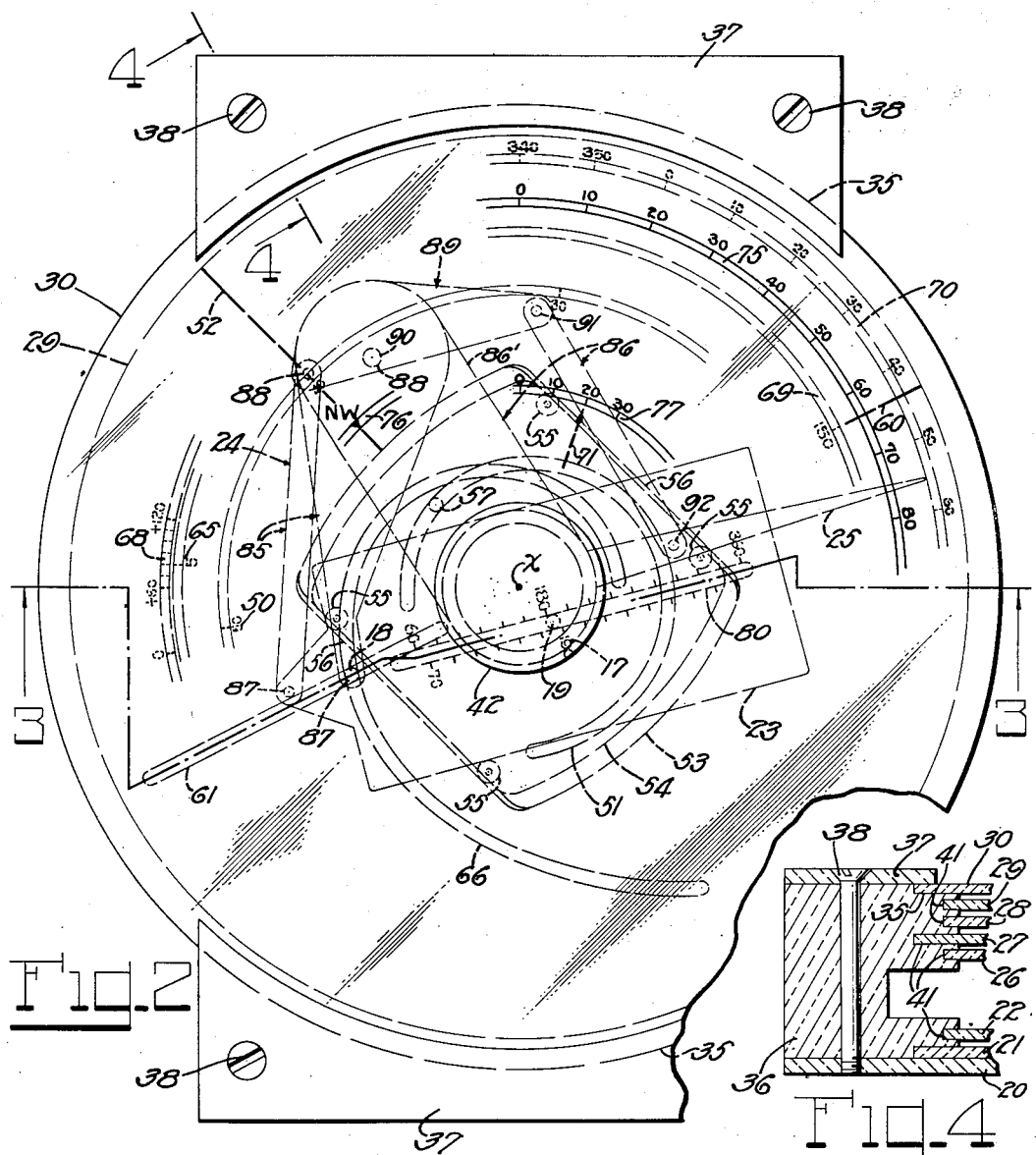

Patented Aug. 3, 1948

2,446,433

UNITED STATES PATENT OFFICE 2,446,433

GEOMETRICAL NAVIGATION INSTRUMENT

John P. Putnam, Boston, Mass., assignor to The Reece Corporation, a corporation of Maine Application December 8, 1944, Serial No. 567,138

3 Claims. (Cl. 33—1)

This invention relates to navigation instruments and more particularly, though not exclusively, to instruments for use in aerial navigation.

The instrument to which the present invention pertains is of the type disclosed in my prior Patent No. 2,357,131, dated August 29, 1944. This instrument can be set in accordance with such readily ascertainable data as the true course of an objective to be reached, the compass variation of the locality, the indicated air speed of a plane, the air temperature, the altitude at which the plane flies, and the direction and velocity of the wind, whereupon the instrument will immediately and directly indicate the ground speed of the plane and the magnetic course to be followed in order to reach the objective under these conditions. The instrument includes a plurality of separately coaxially turnable discs which are relatively angularly adjusted for the purpose of setting the instrument in accordance with the data above mentioned, as well as other operating parts of which one is a linear scale on which the ground speed is read for any setting of the instrument. The various discs and other operating parts of the instrument are superposed upon one another such that the majority of them overlie the ground speed scale and, being made of transparent material, render the ground speed scale visible from the top of the instrument. However, lack of complete transparency of the discs themselves, together with the cumulative glare resulting from light reflection from the surfaces of the discs and operating parts overlying the ground speed scale, whose graduations are necessarily relatively closely spaced, somewhat obscures the latter and renders the reading of the ground speed thereon difficult.

It is the primary aim and object of the present invention to arrange the discs and other operating parts of the instrument so that none of them ever covers that portion of the ground speed scale on which the ground speed is to be read for any setting of the instrument.

The foregoing and other objects of the invention, together with means whereby the latter may be carried into effect, will best be understood from the following description of an illustrative embodiment shown in the accompanying drawings: in which, Fig. 1 is a diagram illustrating the principle of operation involved in the present instrument.

Fig. 2 is a fragmentary top plan view of the instrument.

Fig. 3 is a section through the instrument taken substantially along the line 3—3 of Fig. 2.

Fig. 4 is a fragmentary section taken on the line 4—4 of Fig. 2.

Fig. 5 illustrates a detail of the instrument.

Fig. 6 is a perspective view of the active parts of the instrument shown disassembled.

Briefly, the principle on which the present instrument is based involves the following. A linear, uniformly graduated speed scale 17 (Fig. 1) carries at the zero point thereof a transverse pivot or stud 18, and slidably receives a floating pivot or stud 19. Each of the pivots 18 and 19 is independently movable radially of, and circularly about, a fixed common axis $x$. In using the instrument the pivot 18 is, in any disposition of the scale 17, adjusted radially of the fixed axis $x$ such that the length of the radial arrow or vector $a$ represents, in the calibration of the speed scale 17, the indicated air speed of a plane. The floating pivot 19 is thereupon adjusted radially of, and/or circularly about, the fixed axis $x$ such that the radial arrow or vector $b$ points in the direction of the prevailing wind and its length represents, also in the calibration of the speed scale 17, the wind velocity. The scale 17 may then assume the full line position shown in Fig. 1, for instance, and point in the true direction of flight of the plane as well as indicate the ground speed of the same opposite the pivot 19, if the plane is headed in the direction of the vector $a$. However, the track or true course to the objective to be reached is represented by the arrow $z$, wherefore the track or true direction of flight of the plane has to coincide with said arrow. This is accomplished by merely circularly adjusting the pivot 18 about the fixed axis $x$ until the scale 17 assumes the dot-and-dash line position 17' parallel to the true course $z$. Such circular adjustment of the pivot 18 changes neither the length of the vector $a$ (representing the indicated air speed of the plane), nor the length or angular disposition of the vector $b$ (representing the direction and velocity of the wind), with the result that the ground speed of the plane is indicated on the dot-and-dash line scale 17' opposite the pivot 19 when the plane is headed in the direction of the vector $a'$, but flies actually in the direction of the track $z$ due to side drift caused by the wind. If there is no wind, the pivot 19 is radially shifted into coextension with the common axis $x$ so that the wind vector becomes zero.

Referring now particularly to Figs. 3 and 4, the instrument embodying the principle just described comprises a base plate 20 above which are disposed, in parallel, superposed, coaxial relation, and in the order named, a wind velocity disc 21 (see also Fig. 6), a wind direction disc 22, a track link 23 carrying the above-mentioned ground speed scale 17, a four-bar linkage 24, a track pointer 25, a heading disc 26, an air speed disc 27, an air speed correction disc 28, a magnetic compass disc 29, and a top or true compass point plate or disc 30. All of the above-named parts, with the possible exception of the base plate 20, are composed of transparent (preferably sheet plastic) material to render visible, through overlying parts, scale graduations and other inscriptions (to be described) on underlying parts.

The various operative elements are maintained in cooperating operative interrelation by support members including the base plate 20 as follows: the top disc 30 is received with its periphery in arcuate recesses 35 in the top of two opposite spacers 36 (Figs. 2 and 4), and is firmly held therein against rotation by retainer plates 37. A plurality of screws 38 secure the retainer plates 37 to their respective spacers 36 and the latter to the base plate 20. The lowermost wind velocity disc 21 is journalled coaxially of the top disc 30 on a stud 40 which projects from the base plate 20, while the remaining discs 22, 26, 27, 28 and 29 have co-extensive axial apertures 31 through which they are journalled on a transparent cylindrical plug 42 which is carried by, and depends from, the fixed top plate 30. The discs 22, 26, 27, 28 and 29 are rotatably mounted with their peripheries in arcuate recesses or grooves 41 in the spacers 36 (Fig. 4), and are thus held spaced from one another. The track pointer 25 is journalled on the transparent plug 42 (see particularly Fig. 3) carried by the disc 30 and extending inwardly therefrom coaxially of the several discs. A retainer ring 45 on the plug 42 prevents axial removal of the track pointer 25 therefrom. The track link 23 is preferably held slidable on the wind direction disc 22 by the four-bar linkage 24 which is interposed between said track link 23 and the track pointer 25.

Referring now particularly to Fig. 6, the wind velocity disc 21 is inscribed with a concentric scale 50, preferably 270° in extent and graduated to represent wind velocities in miles per hour, the graduations being preferably uniformly spaced. The disc 21 is further provided with a spiral cam slot 51, whose maximum radius is radially opposite the zero point of the scale 50 and whose minimum radius is radially opposite the maximum point on said scale which is herein shown as representing 50 miles per hour.

The wind direction disc 22 has inscribed thereon a radial index line 52, and is formed with a cut-out guideway 53 which is disposed radially or diametrically of the disc 22 and whose central line is in alignment with the index line 52. Movable in the guideway 53, for movement diametrically of the disc 22, is a slide 54 which carries the previously mentioned floating pivot 19. The side edges of the slide 54 may slidably engage the parallel edges of the guideway 53, or, preferably, said slide is provided with disc-like rollers 55 (Fig. 2) which ride in grooves 56 in said guideway edges. The slide 54 carries a downwardly projecting pin or follower 57 which is received by the spiral cam slot 51 in the wind velocity disc 21, whereby the position of the slide 54 in its guideway 53 is determined by the relative angular position of the discs 21 and 22.

As best shown in Fig. 6, the heading disc 26 is inscribed with a radial index line 60, and formed with a radial slot 61 the longitudinal axis of which is coextensive with the radial index line 60.

The air speed disc 27 is inscribed with a concentric scale 65, graduated to represent altitudes in thousands of feet. Said disc 27 is also provided with a spiral cam slot 66 which receives the previously mentioned pivot or stud 18 (Fig. 1) that extends also through the radial slot 61 (Fig. 6) in the heading disc 26, whereby the radial position of the pivot 18 in said slot 61 is determined by the relative angular position of the discs 26 and 27.

Again referring to Figs. 2 and 6, the air speed correction disc 28 is inscribed about a portion of its margin with a concentric scale 68, graduated to represent temperatures, preferably in degrees Fahrenheit, and about the remainder of its margin with a concentric scale 69, graduated to represent indicator air speeds in miles per hour. The temperature scale 68 on the air speed correction disc 28 is adapted to cooperate with the altitude scale 65 on the air speed disc 27 to apply air speed correction for altitude and temperature.

The magnetic compass disc 29 is inscribed with a concentric scale 70, graduated in degrees and indicating azimuth compass bearings. The disc 29 is further inscribed with a radial arrow or reference line 71.

The top or true compass point disc 30 is inscribed with a concentric scale 75, graduated in degrees and reading in azimuth, and preferably also with a second concentric scale 76, marked with the usual points of the compass. The top disc 30 is preferably further inscribed with an arcuate scale 77, graduated in degrees and indicating magnetic variations east and west.

The index lines 52 and 60 on the discs 22 and 26, respectively, as well as the track pointer 25, are adapted to cooperate with either scale 70 or 75 on the magnetic compass disc 29 and the top disc 30, respectively (see particularly Fig. 2). The index line 52 on the wind direction disc 22 is further adapted to cooperate with the scale 76 on the top disc 30. The arrow 71 on the magnetic compass disc 29 is adapted to cooperate with the compass variation scale 77 on the top disc 30.

Referring now to Figs. 2 and 6, the track link 23 is formed with a centrally disposed, longitudinal slot 80 along the side or sides of which is inscribed the earlier mentioned ground speed scale 17, uniformly graduated to represent ground speeds in miles per hour. The link 23 carries at the zero point of the scale 17 the previously mentioned pivot or stud 18, while the slot 80 slidably receives the previously mentioned pivot or stud 19 on the slide 54 in the wind direction disc 22.

The scales 50, 65, 68 and 69, representing wind velocities, altitudes, temperatures and air speeds, respectively, being circularly arranged, permit a wider range, more open spacing and larger marking, of their graduations than would be possible with rectilinear scales. The several circular scales 70, 75, 68, 69, 65, 50, 76 and 77, while concentrically disposed, are located at different radial distances from the common axis $x$ of the instrument so that, in all positions of adjustment, all are clearly visible and unobscured by any of the others, and, therefore, can be easily read. The ground speed scale 17 on the track link 23 cooperates with the pivot 19, as mentioned, and in all possible positions of adjustment, the position of the pivot 19 and of the portion of the scale 17 adjacent thereto is within, or removed from, all of the other scales, whereby said ground speed scale can be read without any interference from the other scales.

The instrument described so far, with the exception of the transparent plug 42 and the track pointer 25, is in most respects like the instrument shown and described in my mentioned prior Patent No. 2,357,131. The track pointer 25, which is rotatable about the plug 42, is drivingly connected with the track link 23 by the four-bar linkage 24, which is similar in function to that shown and described in my copending application Serial No. 495,089, filed July 17, 1943, now Patent No. 2,376,006, granted May 15, 1945. However, the linkage 24 of the present application is so arranged and connected with the track link 23 and track pointer 25 that no part of the linkage or pointer encroaches upon the scale 17 in any operative position of the track link 23. Thus the present arrangement distinguishes from that shown in my said prior Patent No. 2,376,006 in that a clear view of the scale 17 unencumbered by the linkage 24 and track pointer 25 is provided from above. The linkage 24 is so constructed and arranged that the track pointer 25 will always maintain the same relative angular disposition to and preferably extend parallel to the track link 23 in any position of the latter. The linkage 24 comprises two pairs of parallel links 85 and 86, of which the links 85 are pivotally connected at 87 and 88 with the track link 23 and a floating spacer 89, respectively (Figs. 2 and 6). One of the other links 85, to wit 85', is turnable on the plug 42 (Fig. 3) and pivotally connected at 90 with the floating spacer 89, while the remaining link 86 is pivotally connected at 91 and 92 with the floating spacer 89 and the track pointer 25, respectively. The various elements of the four-bar linkage 24 are so located in spaced parallel planes (Figs. 2 and 3) that the center line or slot 80 of the track link 23 may relatively shift to either side of the track pointer 25 which, however, maintains the same relative angular disposition and preferably remains parallel to it, according to the circumferential and radial adjustment of the indicator 19 about the axis and sweep through a maximum range the limits of which are reached only when the links of either pair 85 or 86 engage each other.

The use of the instrument may be explained in connection with the following illustrative example, reference being had particularly to Fig. 2. Assume that a flight is to be undertaken to an objective whose true bearing is azimuth 75°, that the compass variation for the locality is 20° east, that the indicated air speed of the plane is 150 miles per hour, that the pilot is flying at an altitude of 5000 feet, that the temperature is +80° F., and that the wind is blowing 40 miles per hour from the northwest. The instrument may then be set as follows: The magnetic compass disc 29 is turned until the arrow 71 thereon points to the 20° east variation mark of the scale 77 on the non-rotatable top or true compass point disc 30 and the zero mark of the azimuth scale 70 on said magnetic compass disc 29 aligns with the 20° mark of the azimuth scale 75 on said top disc 30.

Next, the air speed correction disc 28 may be set relative to the air speed disc 27 to undertake the correction in the indicated air speed of the plane in accordance with the flight altitude and air temperature. To this end, the air speed correction disc 28 may be turned relative to the air speed disc 27 until the +80° F. mark of the temperature scale 68 on the former disc aligns with the 5000 ft. mark of the pressure altitude scale 65 on the latter disc.

Next, the instrument may be set in accordance with the indicated air speed of the plane (150 miles per hour). To this end, the air speed disc 27 and relatively adjusted air speed correction disc 28 are turned in unison relative to the heading disc 26 until the 150 miles per hour mark of the speed scale 69 on the disc 28 aligns with the index line 60 on the disc 26. The indicated air speed scale 69 on the disc 28, the spiral cam slot 66 in the disc 27 and the index line 60 and radial slot 61 in the disc 26, are so coordinated that, if the discs 27 and 28 were adjusted for sea level or zero altitude and +60° F. (zero mark of pressure altitude scale 65 aligned with +60° F. mark of temperature scale 68) for reasons hereinafter explained, and the instrument set or adjusted for an indicated air speed of 150 miles per hour, the fixed pivot 18 on the track link 23 would be shifted in the radial slot 61 into a position in which its distance from the fixed axis $x$ of the instrument represents, in the calibration of the ground speed scale 17 on the track link 23, the indicated air speed (150 miles per hour). Hence, by setting the instrument for zero altitude and +60° F., the true air speed as represented by the distance of the pivot 18 from the axis $x$ is the same as the indicated air speed for which the instrument is set, and no correction of the true air speed due to altitude and temperature takes place. The reason for this lies in the standard practice to give the indicated air speed of a plane at +60° F., and at sea level or zero altitude, and the scales 65, 68 and 69 are so arranged and coordinated that the true air speed is the same as the indicated air speed when the instrument is set for the latter speed and the standard temperature +60° F. and zero altitude. For any other altitude and temperature setting of the instrument, the indicated air speed scale 69 is so adjusted relative to the spiral cam slot 66 that, on setting the instrument for a certain indicated air speed, the corresponding altitude and temperature correction is included in the true air speed as represented by the distance of the pivot 18 from the fixed axis $x$ of the instrument. The exact arrangement of the temperature and pressure altitude scales 68, 65, and their cooperation with the indicated air speed scale 69, is fully shown and described in my beforementioned prior Patent No. 2,357,131, and requires no further explanation herein.

Next, the instrument may be set in accordance with the direction of the wind (northwest). To this end, the wind direction disc 22 is turned until the index line 52 thereon aligns with the NW mark of the scale 76 on the top disc 30, thereby also bringing the floating pivot 19 on the slide 54 diametrically opposite said NW mark.

The instrument may next be set in accordance with the velocity of the wind (40 miles per hour). To this end, the wind velocity disc 21 is turned relative to the set wind direction disc 22 until the index line 52 on the latter disc aligns with the 40 miles per hour mark of the scale 50 on the former disc, whereby the slide 54 is shifted in the disc 22 until the pivot 19 thereon assumes a position in which its distance from the fixed axis x of the instrument represents, in the calibration of the ground speed scale 17 on the track link 23, the wind velocity (40 miles per hour). An imaginary straight line drawn from the pivot 19 to the fixed axis x of the instrument (Fig. 2) constitutes a wind direction and velocity vector such as the vector b in Fig. 1.

The instrument is then finally set in accordance with the true bearing of the objective (azimuth 75°). To this end, the heading disc 26 and the air speed disc 27 with the relatively adjusted air speed correction disc 28, are turned in unison relative to the set wind velocity and direction discs 21, 22 until the track pointer 25 aligns with the 75° mark of the azimuth scale 75 on the top disc 30 whereby said track pointer 25 also indicates on the azimuth scale 70 of the set disc 29 (Fig. 2) the magnetic bearing of the objective (azimuth 55°). The track link 23 is, of course, moved with the track pointer, as explained, and remains parallel with the latter. An imaginary line then drawn from the pivot 18 to the fixed axis x (Fig. 2) constitutes a true air speed and heading vector such as the vector a' in Fig. 1.

The instrument being now set, the magnetic heading is indicated by the index line 60 of the heading disc 26 on the azimuth scale 70 of the disc 29 (and the true heading on the azimuth scale 75 of the top plate 30), while the ground speed is indicated on the scale 17 of the track link 23 opposite the pivot 19. The adjustments above described, and illustrated in Fig. 2, show that in order to fly a track whose true bearing is azimuth 75° under the conditions above stated, the pilot's magnetic heading should be azimuth 44°, and that the ground speed of the plane is about 183 miles per hour.

As previously mentioned, all the scales of the instrument, except the ground speed scale 17 on the track link 23, are arranged circularly and at different radial distances from the axis x of the instrument, wherefore they permit a wider range, more open spacing and larger marking of their graduations than would be possible with rectilinear scales. The open spacing and large marking of the graduations of these circular scales renders them legible to the user of the instrument despite the cumulative glare resulting from light reflection from the surfaces of the discs and any lack of complete or clear transparency of the latter. However, the graduations of the rectilinear ground speed scale 17 are of necessity relatively closely spaced in order that said scale may have the wide speed range dictated by the adjustability of the instrument to the wide variation in the indicated air speed of modern aircraft and to a wide range of the wind velocity. It is for the purpose of preventing the lack of complete transparency of, and glare from, the discs and other parts overlying the track link 23 from obscuring and interfering with the clear reading of the ground speed scale 17, that the plug 42, which is a unitary piece of clearly transparent material, has been mounted in the instrument as the sole intervening element between said scale 17 and the eyes of the user of the instrument. The diameter of the plug 42 and of the central apertures of the discs through which it passes, is such that the portion of the ground speed scale 17 adjacent the pivot 19 lies, for any setting of the instrument, within the circular confines of said plug and apertures, so that the ground speed can always be distinctly read through the plug 42. Furthermore, the track link 23 is made so wide that neither side edge thereof appears behind the plug 42 in any setting of the instrument, so that the pivot 19 and the portion of the scale 17 adjacent thereto are the only elements that appear to the eye behind the plug 42 against the otherwise uniform background of the track link 23.

I claim:

1. A navigation instrument, comprising a straight graduated speed scale having an integral pivot at the zero point of the graduation, a transparent compass dial at one side of, and parallel to, said scale and having a central transparent cylindrical plug extending toward said scale, transparent elements journalled on said plug and relatively turnable for moving said pivot parallel to said dial into any position within certain limits, a radial pointer journalled on said plug and cooperating with said dial, a linkage so drivingly connecting said scale and pointer that they are parallel in any position, and so arranged that said linkage remains outside the confines of said plug in any position of said scale, a second pivot slidable on said scale, and means at the other side of said scale for moving said second pivot parallel to said dial into any position within certain limits, the diameter of said plug being such that said second pivot and the scale graduations nearest thereto are visible therethrough in any position of said scale.

2. A navigation instrument, comprising a straight graduated speed scale having an integral pivot at the zero point of the graduation, a transparent compass dial at one side of, and parallel to, said scale and having a central transparent cylindrical plug extending toward said scale, transparent discs journalled on said plug, one of said discs having a radial slot slidably receiving said pivot and the other disc having a cam for shifting said pivot in said slot on relative rotation between said discs, a radial pointer journalled on said plug and cooperating with said dial, a linkage so drivingly connecting said scale and pointer that they are parallel in any position, and so arranged that said linkage remains outside the circular confines of said plug in any position of said scale, a second pivot slidable on said scale, and means at the other side of said scale for moving said second pivot parallel to said dial into any position within certain limits, the diameter of said plug being such that said second pivot and the scale graduations nearest thereto are visible therethrough in any position of said scale.

3. A navigation instrument comprising a straight graduated speed scale having an integral pivot at the zero point of the graduation, a transparent compass dial and cooperating coaxial relatively turnable transparent elements at one side of, and parallel to, said scale and having apertures therein, at least one of said turnable elements being arranged for moving said pivot parallel to said dial into any position within certain limits, a radial pointer cooperating with said dial and turnable coaxially of it, a linkage so drivingly connecting said scale and pointer that they may move cooperatively to any relative position in planes parallel to said dial within certain limits, in such manner that they always maintain the same relative angular disposition in any such relative position, and so arranged that said linkage remains outside the limits of visibility through said apertures in any position of said scale, a second pivot slidable on said scale, and means at the other side of said scale for moving said second pivot parallel to said dial into any position within certain limits, the areas of said apertures being such that said second pivot and the scale graduations nearest thereto are visible therethrough in any position of said scale, and support members maintaining said scale, turnable elements and pointer in cooperating operative interrelation.

JOHN P. PUTNAM.

REFERENCES CITED

The following references are of record in the file of this patent:

UNITED STATES PATENTS

| Number | Name | Date |
|---|---|---|
| 1,896,997 | Bennett | Feb. 7, 1933 |
| 2,341,924 | Kruck | Feb. 15, 1944 |
| 2,376,006 | Putnam | May 15, 1945 |